(12) United States Patent
Tanaka (10) Patent No.: US 7,143,504 B2
(45) Date of Patent: Dec. 5, 2006

(54) METHOD OF MANUFACTURING A DISPLAY STRUCTURE

(75) Inventor: Shuichi Tanaka, Chiuo (JP)

(73) Assignee: Seiko Epson Corporation (JP)

( * ) Notice: Subject to any disclaimer, the term of this patent is extended or adjusted under 35 U.S.C. 154(b) by 350 days.

(21) Appl. No.: 10/679,948

(22) Filed: Oct. 6, 2003

(65) Prior Publication Data

US 2004/0224598 A1 Nov. 11, 2004

(30) Foreign Application Priority Data

Oct. 16, 2002 (JP) .............................. 2002-301694

(51) Int. Cl.
H01F 7/06 (2006.01)

(52) U.S. Cl. ...................... 29/602.1; 29/592.1; 29/831; 29/835; 29/846; 29/854; 29/871; 349/149; 349/150; 349/151; 445/24

(58) Field of Classification Search ............... 29/592.1, 29/602.1, 831, 835, 846, 854, 871–873; 349/149–152; 445/24

See application file for complete search history.

(56) References Cited

U.S. PATENT DOCUMENTS 4,742,183 A * 5/1988 Soloway et al. ............ 174/254
5,257,718 A * 11/1993 Chiu ........................ 228/179.1
5,362,547 A * 11/1994 Yamazaki ..................... 428/167
5,436,744 A 7/1995 Arledge et al. ................ 359/82
5,565,885 A * 10/1996 Tamanoi ..................... 345/100
6,121,988 A 9/2000 Uchiyama .................... 347/208

FOREIGN PATENT DOCUMENTS

| CN | 1158689 A | 9/1997 |
|---|---|---|
| JP | 5-323354 | 12/1993 |

OTHER PUBLICATIONS

"Performance characteristics of nematic liquid crystal display devices"; Creagh, L.T.; Kmetz, A.R.; Reynolds, R.A.; Electron Devices, IEEE Transactions on vol. 18, Issue 9, Sep. 1971; pp. 672-679.*

* cited by examiner

Primary Examiner—Paul D. Kim
(74) Attorney, Agent, or Firm—Harness, Dickey & Pierce, P.L.C.

(57) ABSTRACT

A method of manufacturing a display structure includes the steps of arranging at least a display area, an extension area, and an IC mounting area on a display substrate, connecting a flexible tape substrate to the extension area of the display substrate, separating a part of the display substrate by cutting at a cutting portion which is a part under the flexible tape substrate on the extension area of the display substrate, and disposing a cutting substrate which is the separated part, on a back side which is opposite to a side where a display is mounted, of the display substrate.

11 Claims, 5 Drawing Sheets

METHOD OF MANUFACTURING A DISPLAY STRUCTURE

BACKGROUND OF THE INVENTION

1. Field of the Invention

The present invention relates to a display structure, a method of manufacturing a display structure, and an electronic apparatus.

2. Description of Related Art

Recently, in portable electronic apparatus such as a mobile telephone, an electronic personal organizer, and a PDA (personal digital assistant), a flat panel display has been widely used as a display device showing a variety of information. A liquid crystal display (LCD), an electro luminescence panel (ELP), a plasma display panel (PDP), and the like are cited as the flat panel display.

In the portable electronic apparatus, the miniaturization of overall apparatus is required. In addition, there is a demand that an area referred to as "frame" hereafter) other than a display area in the display device (display) be narrowed because of a demand for good design. That is, there is a demand that the display area be made as large as possible and the frame be made as narrow as possible because of a demand that the display is housed within limited space in a housing, and an amount of information which can be shown be increased. Technique for mounting an electronic circuit and an IC for driving on a back side of a substrate has been considered with the aim of such narrowing of the frame of the display, as is shown, for example, in Japanese Unexamined Patent Application, First Publication No. H05-323354.

Here, there is a COG (chip on glass) mounting or a COF (chip on film) mounting as a method of mounting a display. The COG mounting is generally a method of mounting an IC chip for driving on a glass substrate. The COF mounting is generally a method of connecting a film (flexible) substrate such as a polyimide film to the glass substrate so as to mount the IC chip for driving on a film substrate.

However, it is difficult to make the frame narrow in the conventional COG mounting. The reason is that, in the conventional COG mounting, the IC chip for driving is mounted on the frame of the display such that an area, to which the display area, an IC chip area, and a flexible printed circuit (referred to as "FPC" hereafter) are connected, is required in one side of the display. Here, an area to which the FPC is connected is one to which the FPC connecting to external of the portable electronic equipment is connected.

On the other hand, in the COF mounting, to make the frame narrow is possible by folding the film substrate so as to dispose the IC chip area on the back side of the display area of the display. However, a coefficient of thermal expansion of the film substrate is greatly different from that of an IC chip such as a silicon chip installed on the substrate. Consequently, in the COF mounting, there is a problem that alignment and mounting condition in IC chip mounting fluctuate with temperature changes such that a product life is apt to become short.

The present invention takes such conditions into consideration, with an object of providing a display structure of which the frame can be narrowed, and preventing it from temperature changes so as to be capable of prolonging its product life, a method of manufacture thereof, and electronic apparatus therewith.

SUMMARY OF THE INVENTION

The first aspect of the present invention is a method of manufacturing a display structure, having the steps of arranging at least a display area, an extension area, and an IC mounting area on a display substrate, connecting a flexible tape substrate to the extension area of the display substrate, separating a part of the display substrate by cutting at a cutting portion which is a part under the flexible tape substrate on the extension area of the display substrate, and disposing a cutting substrate which is the separated part, on a back side which is opposite to a side where a display is mounted, of the display substrate.

According to the method of manufacturing a display structure, as the cutting substrate includes the IC mounting area, an integrated circuit for driving (IC chip and the like) can be mounted on the cut substrate. Therefore, the integrated circuit for driving (IC chip and the like), which is conventionally mounted on a frame of the display substrate, can be disposed on the back side of the display substrate such that the frame of the display substrate can be made greatly narrower than a conventional frame.

Furthermore, it is preferable that the display substrate be a glass substrate, the IC mounting area be included in the area which is to be the cutting substrate of the display substrate, and an integrated circuit for driving be mounted on the IC mounting area by COG bonding before the cutting.

According to this, the display structure including the narrowed frame can be manufactured by using a conventional mounting machine for the COG bonding. In addition, the integrated circuits for driving are mounted by the COG bonding, and the integrated circuits for driving is made of silicon chips such that a coefficient of thermal expansion of the display substrate composed of the glass substrate can be approximately the same thermal expansion of the integrated circuits for driving, enabling reliability and a product life of such equipment to be improved.

Furthermore, it is preferable that the display mounted on the display area, the flexible tape substrate connected to the extension area, and the integrated circuit for driving mounted on the IC mounting area be mounted on a front side which is a side where the display is mounted, of the display substrate before the cutting.

According to this, the display such as a liquid crystal panel, the flexible tape substrate, the integrated circuit for driving, and the like are mounted on one side (front side) of the display substrate before cutting the substrate. Therefore, since a step of turning the display substrate upside down, or the like is unnecessary, it is possible to reduce a production cost as compared to a method in which various parts are mounted on both the front side and the back side of the display substrate. In addition, since the display, the flexible tape substrate, the integrated circuit for driving, and the like are mounted on the display substrate before cutting the display substrate, alignment for mounting is made easier as compared to a case where mounting of each part (including wirings) is carried out after the cutting. In addition, before the display substrate is cut, alignment between the display substrate and the cut substrate is unnecessary; that is, it is possible to reduce the production cost as compared to a method in which two substrates are used from the first.

Furthermore, it is preferable that a plurality of parallel wirings be formed on the front side and the extension area of the display substrate before the cutting.

According to this, the wirings can be formed on the extension area (front surface) of the display substrate at the same time as forming the display on the display area (front surface) of the display substrate. Therefore, it is possible to reduce the production cost and manufacturing time as compared to a method in which the wirings are formed on the back side of the display substrate.

Furthermore, it is preferable that the flexible tape substrate be connected to the extension area of the display substrate in such a manner that one end of the flexible tape substrate is connected to a part which is to be the cut substrate, of the display substrate, and the other end of the flexible tape substrate is connected to a part other than the part which is to be the cut substrate, of the display substrate.

According to this, the display on the display substrate and the integrated circuit for driving (including a flexible substrate for external connection) on the cut substrate and the like can be electrically connected, and the display substrate and the cut substrate can be flexibly and mechanically connected.

Furthermore, it is preferable that a plurality of parallel wirings is formed on the flexible tape substrate, and each wiring on the flexible tape substrate is respectively connected to each wiring on the extension area when the flexible tape substrate is connected to the extension area of the display substrate.

According to this, the wiring between each wiring on the extension area and each wiring on the flexible tape substrate can be facilitated.

Furthermore, it is preferable that a flexible tape substrate for external connection is connected to the IC mounting area which is on the front side of the display substrate before the cutting.

According to this, the mounting of the flexible tape for external connection an be carried out at approximately the same the as the mounting of the display, the flexible tape substrate, and the integrated circuit for driving. Therefore, it is possible to reduce the production cost.

Furthermore, it is preferable that the flexible tape substrate be in a state of bent when the flexible tape substrate is connected to the extension area of the display substrate.

According to this, the display substrate and the cut substrate are connected with the flexible tape substrate having sufficient length such that the cut substrate can be disposed on the back side of the display substrate with flexibility.

Furthermore, it is preferable that an area of which width is twice or more of the thickness of the display substrate is removed from the extension area when the display substrate is cut.

According to this, as a result, the display substrate and the cut substrate are connected with the flexible tape substrate having the sufficient length such that the cut substrate can be disposed on the back side of the display substrate with flexibility.

Furthermore, the method of manufacturing a display structure, preferably further includes the step of cutting a groove at the cutting portion on the display substrate before the cutting, wherein the cutting is carried out by applying a force that tend to bend the display substrate on the display substrate after the groove is formed.

According to this, a part of the display substrate can be easily separated in the same manner as, for example, a method in which a glass is cut to make a desired shape by scratching the glass with a glass cutter and exerting a force to the glass.

Furthermore, a method of manufacturing a display structure, preferably further includes the steps of forming terminals on the wirings on the extension area of the display substrate, and inspecting a circuit operation by using the terminals before the cutting.

According to this, since the extension area is specially arranged, forming the terminals on the wirings on the extension area is facilitated. Conventionally, since the fame is narrowed, a space on such wirings is insufficient; therefore, it is almost impossible to form the terminals.

Furthermore, it is preferable that the wirings on the extension area of the display substrate be formed as transparent electrodes.

According to this, a step of connecting the wirings on the flexible tape substrate to the wirings on the extension area can be easily carried out.

Furthermore, it is preferable that the groove be formed by using laser.

According to this, the groove for cutting the display substrate can be easily and rapidly formed. Here, instead of forming the groove, such cutting may be carried out by applying laser to the cut so as to heat the part, thereafter exerting a force to the display substrate.

The second aspect of the present invention is a display structure that is manufactured by using the method of manufacturing a display structure.

According to the display structure, it is possible to provide the display structure of which the frame can be made greatly narrower as compared to the display structure manufactured by conventional COG mounting, and which is prevented from temperature changes so as to be capable of prolonging its product life as compared to the display structure manufactured by conventional COF mounting.

The third aspect of the present invention is an electronic apparatus having the display structure.

According to the electronic apparatus, a form of overall apparatus can be miniaturized with enlarging an area of the display, and it is possible to provide electronic apparatus having high reliability and long product life at low price.

DETAILED DESCRIPTION OF THE INVENTION (First Embodiment)

A method of manufacturing a display structure, according to a first embodiment of the present invention will be described hereafter with reference to drawings.

(First Step)

Figure 1:
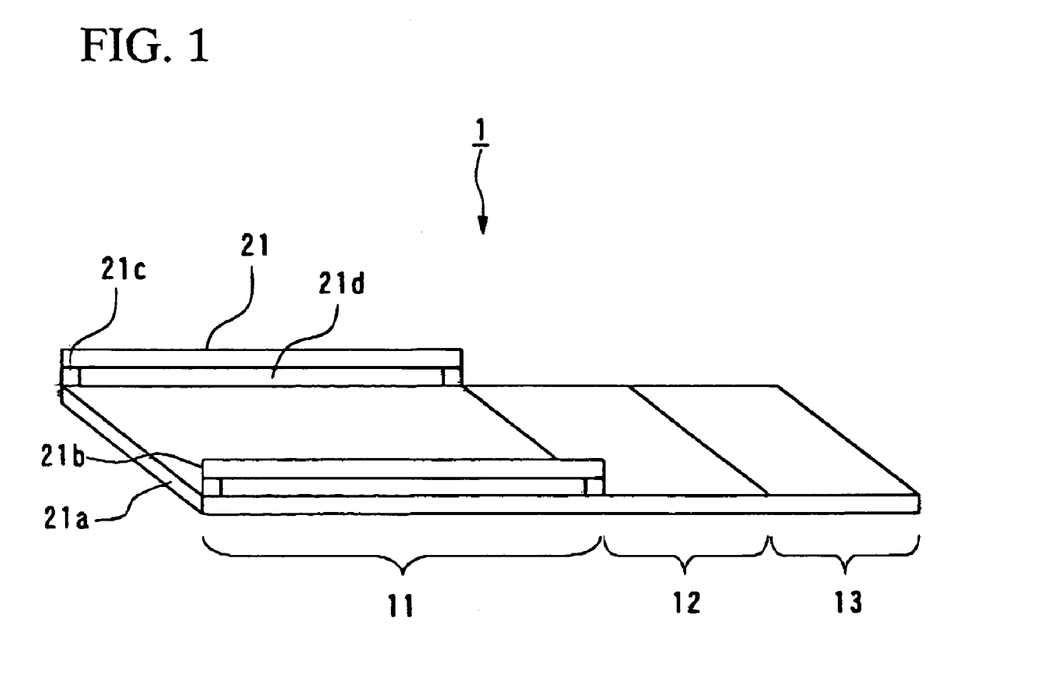
FIG. 1 is a perspective view showing a frame format of the first step of the first embodiment of the present invention.

FIG. 1 is a perspective view showing a first step of the method of manufacturing a display structure according to the embodiment of the present invention. In the first step, a display substrate 1 is formed. The display substrate 1 includes a display area 11, an extension area 12, and an IC mounting area 13. In addition, the display substrate 1 is composed of a glass substrate.

The display area 11 is an area on which a display device (display substrate) having a liquid crystal device, an organic electro luminescence device, or a plasma device is installed. The extension area 12 is a part that a conventional display structure does not include, and is one of features of the present embodiment. The extension area 12 is an area on which wirings electrically connecting the display area 11 and the IC mounting area 13 are formed. The IC mounting area 13 is an area where an IC for driving (integrated circuit for driving), which drives the display device on the display area 11, is mounted.

In addition, in the first step, a display device 21 is installed on the display area 11. The display device 21 is, for example, a liquid crystal device (liquid crystal panel). Furthermore, the display device 21 is formed by sealing liquid crystal 21d between a first substrate unit 21a and a second substrate unit 21b, which are mutually opposed. The first substrate unit 21a is composed of a part of the display substrate 1, which is a glass substrate.

The first substrate unit 21a is formed by carrying out the steps of forming optically transparent first electrodes (not shown in the drawing) on a plane, which is opposite to the second substrate unit 21b, forming an over coat layer composed of silicon dioxide and the like hereunder, and furthermore forming an alignment layer, which is treated with rubbing to attain orientation of the liquid crystal, composed of polyimide resin hereunder.

The second substrate unit 21b is formed by carrying out the steps of forming optically transparent second electrodes (not shown in the drawing) on a plane, which is opposite to the first substrate unit 21a, forming the over coat layer composed of silicon dioxide and the like thereon, and furthermore forming the alignment layer, which is treated with rubbing to attain orientation of the liquid crystal, composed of the polyimide resin thereon.

The first electrodes are composed of an optically transparent conductive material such as ITO. The second electrodes are composed of a metal film such as an aluminum film, in which slits (openings) are formed. The first electrodes are formed in a stripe manner. Here, the second electrodes are arranged to cross the first electrodes, and are formed in a stripe manner. A plurality of areas where these electrodes cross in a dot matrix manner, forms pixels for showing visible images. Furthermore, the area defined by an ensemble of these plural pixel areas becomes a display area for showing the visible images such as characters.

Though a passive monochrome semi-transparent reflection type liquid crystal device has been described in the embodiment, the embodiment can be applied to a passive color semi-transparent reflection type liquid crystal display device by carrying out steps of, for example, forming a color filter layer between the first substrate and the first electrodes, sequentially forming the overcoat layer (not shown in the drawing) composed of silicon dioxide and the like thereon, and furthermore forming the alignment layer which is treated with rubbing to attain orientation of the liquid crystal, composed of polyimide resin thereon.

In the same way, the embodiment may be applied to all liquid crystal display devices formed by holding the liquid crystal between two glass substrates, that is, a reflection type, a semi-transparent reflection type, or a transparent type monochrome or color liquid crystal display device driven by passive matrix driving (STN liquid crystal), and a reflection type, a semi-transparent reflection type, and a transparent type monochrome and color liquid crystal display device driven by active matrix driving (TN liquid crystal) using a TFT (Thin Film Transistor) device and a TFD (Thin Film Diode) device.

A plurality of spacers (not shown in the drawing) is disposed in a dispersed manner on a surface of a liquid crystal layer side of any one of the first substrate unit 21a and the second substrate unit 21b, in addition, a sealing material is installed in a frame shape on one of the substrate units.

If the first substrate unit 21a and the second substrate unit 21b are bonded together with the sealing material, a gap, for example, about 5 μm, so-called a cell gap, having a uniform dimension, which is retained by the spacers, is formed between the substrate units. The liquid crystal (electrical engineering material) 21d is injected into the cell gap.

(Second Step)

Figure 2:
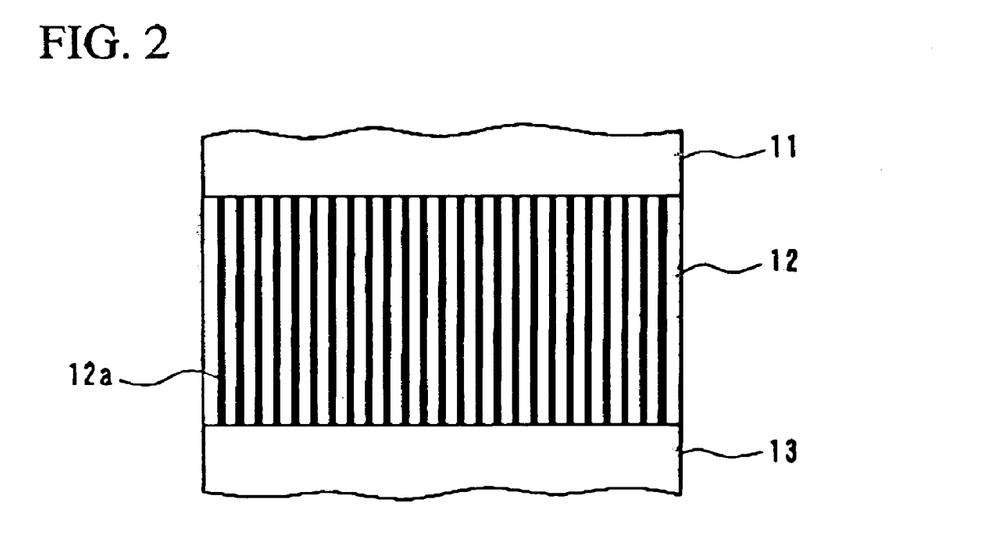
FIG. 2 is a plan view showing an essential part of the second step of the first embodiment of the present invention.

Next, a second step of the present embodiment will be described with reference to FIG. 2. FIG. 2 shows the second step of the method of manufacturing a display structure according to the present embodiment, and is a plan view showing an essential part of a periphery of the extension area 12 of the display substrate 1.

In the second step, a plurality of parallel wirings 12a is formed on the extension area 12 of the display substrate 1. The wirings 12a are preferably formed as transparent electrodes. In addition, the wirings 12a may be formed simultaneously with formation of the display device 21 in the first step.

The wirings 12a function as a part of wirings electrically connecting the display device mounted on the display area 12 and the IC for driving mounted on the IC mounting area 13. Here, the IC for driving mounted on the IC mounting area 13 is an integrated circuit, in which a plurality of drivers driving the display device 21 mounted on the display area 12 is installed.

(Third Step)

Figure 3:
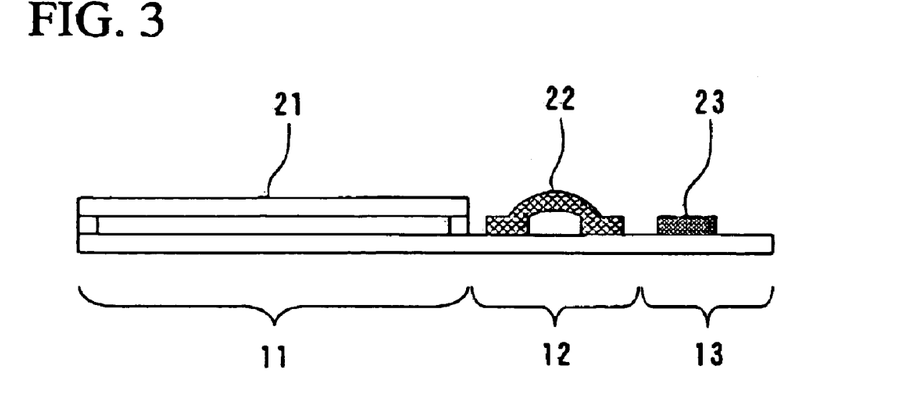
FIG. 3 is a side view showing a frame format of the third step of the first embodiment of the present invention.

Next, a third step of the present embodiment will be described with reference to FIG. 3. FIG. 3 is a side view showing the display substrate 1 in the third step of the method of manufacturing a display structure according to the present embodiment.

In the third step, an IC for driving 23 is mounted on the IC mounting area 13 of the display substrate 1 by conventional COG bonding. That is, a semiconductor chip forming the IC for driving 23 is directly mounted on a glass substrate forming the display substrate 1 by using a conventional machine for COG bonding.

Furthermore, in the third step, a flexible tape substrate (FPC) 22 is bonded to the extension area 12 of the display substrate 1 as shown in FIG. 3. The flexible tape substrate 22 is a elastic film substrate, on which a plurality of parallel wirings is formed. In the bonding, one end of each wiring on the flexible tape substrate 22 is respectively bonded to each wiring 12a in the vicinity of the display area 11 on the extension area 12, in addition, the other end of each wiring on the flexible tape substrate 22 is respectively bonded to each wiring 12a in the vicinity of the IC mounting area 13 on the extension area 12. Therefore, each wiring of the flexible tape 22 is respectively connected to each wiring 12a on the extension area 12 in parallel.

Concrete methods of bonding each wiring on the flexible tape 22 to each wiring 12a on the extension area 12 include, for example, heat bonding using an anisotropic conductive film (ACF). The anisotropic conductive film is formed by, for example, dispersing a large number of conductive particles into thermoplastic or thermosetting resin for bonding.

(Fourth Step)

Figure 4:
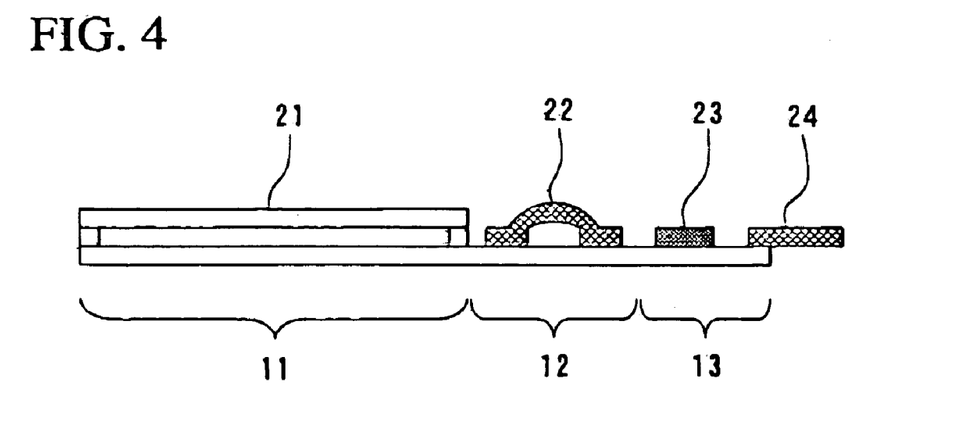
FIG. 4 is a side view showing a frame format of the forth step of the first embodiment of the present invention.

Next, a fourth step of the present embodiment will be described with reference to FIG. 4. FIG. 4 is a side view showing the display substrate 1 in the fourth step of the method of manufacturing a display structure according to the present embodiment.

In the fourth step, as shown in FIG. 4, a flexible tape substrate (FPC) for external connecting 24 is bonded to an end of the IC mounting area 13. The flexible tape substrate for external connecting 24 provides driving signals to the IC for driving 23 mounted on the IC mounting area 13. In addition, the flexible tape substrate for external connecting 24 is a elastic film substrate, on which a plurality of parallel wirings is formed, as well as the flexible tape substrate 22. Furthermore, the bonding is implemented by respectively bonding each wiring on the flexible tape substrate for external connecting 24 to a terminal of the IC for driving 23 mounted on the IC mounting area 13. In the bonding, for example, the heat bonding using the anisotropic conductive film is also used.

(Fifth Step)

Figure 5:
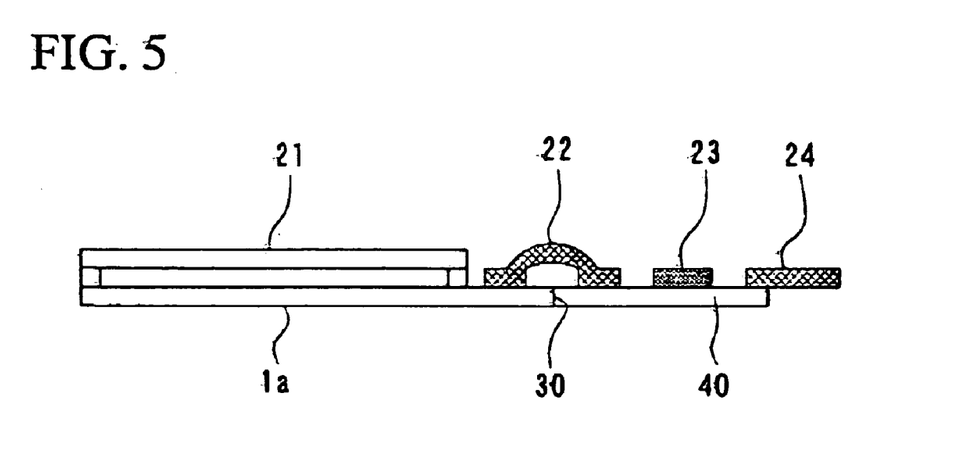
FIG. 5 is a side view showing a frame format of the fifth step of the first embodiment of the present invention.

Next, a fifth step of the present embodiment will be described with reference to FIG. 5. FIG. 5 is a side view showing the display substrate 1 in the fifth step of the method of manufacturing a display structure according to the present embodiment.

In the fifth step, the display substrate 1 is cut at a line under the flexible tape substrate 22 bonded to the extension area 12 of the display substrate 1, that is, at a cutting portion 30, which is a transverse line in generally the center of the extension area 12 of the display substrate 1. By the cutting, the display substrate 1 is divided into two parts; that is, the parts are a substrate (a display substrate 1a) having the display area 11 and one part of the extension area 12, and a cutting substrate 40 having the IC mounting area 13 and the other part of the extension area 12. The display substrate 1a and the cutting substrate 40 divided in such way are electrically and mechanically connected with the flexible tape substrate 22.

In the cutting of the display substrate 1, an area of which width is twice or more of the thickness of the display substrate 1, may be removed along a line of the cutting portion 30. If the flexible tape substrate 22 is bonded to the display substrate 1 in the state of bent as shown in FIG. 5 in the third step, such removing is unnecessary.

(Sixth Step)

Figure 6:
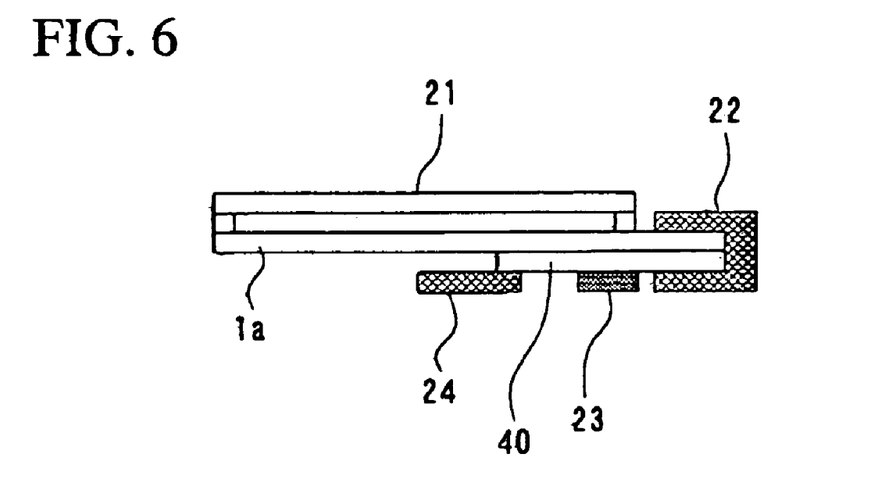
FIG. 6 is a side view showing a frame format of the sixth step of the first embodiment of the present invention.

Next, a sixth step of the present embodiment will be described with reference to FIG. 6. FIG. 6 is a side view showing the display substrate 1 in the sixth step of the method of manufacturing a display structure according to the present embodiment.

In the sixth step, the cutting substrate 40 is disposed on a back side of the display substrate 1a as shown in FIG. 6. That is, the cutting substrate 40 is disposed on the back side, which is opposite to a side (frontside) on which the display device 21 is mounted, of the display substrate 1a, by bending the flexible tape substrate 22 in a U-shaped manner. The cutting substrate 40 is fixed with an adhesive if necessary.

According to the method of manufacturing a display structure of the present embodiment, by the above method, the cutting substrate 40, on which the IC for driving 23 and the flexible tape substrate for external connection 24 are mounted, can be disposed on the back side of the display substrate 1a such that a frame of the display substrate 1a can be made greatly narrower than a conventional frame, even though the IC for driving 23 is bonded to the glass substrate by the COG bonding.

Furthermore, according to the method of manufacturing a display structure of the present embodiment, the display device 21 and the wirings 12a are formed on one side (front side) of the display substrate 1, thereto the flexible tape substrate 22, the IC for driving 23, and the flexible tape substrate for external connection 24 are mounted on the other side of the display substrate 1, thereafter the display substrate 1 is cut. According to this, as compared to the method in which various parts are mounted on both the front side and the back side of the display substrate 1, a process of turning the display substrate 1 upside down and the like becomes unnecessary. Therefore, it is possible to reduce the production cost (Second Embodiment)

Figure 7:
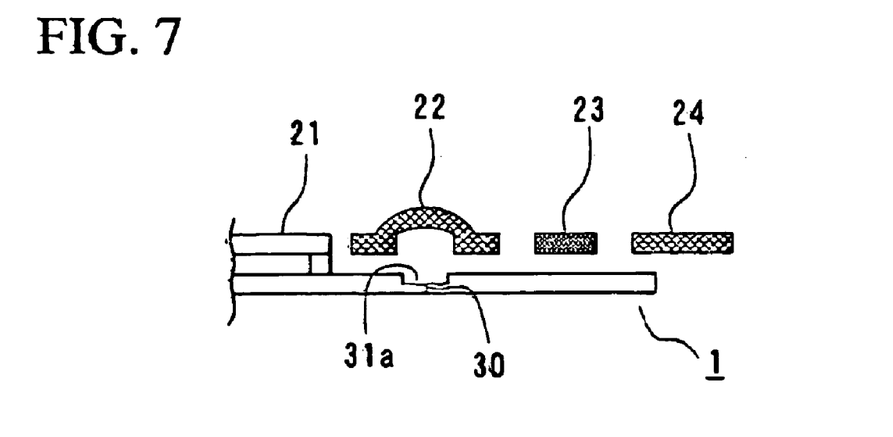
FIG. 7 is a side view showing a frame format of the second embodiment of the present invention.

Next, a method of manufacturing a display structure according to a second embodiment of the present invention will be described with reference to drawings. FIG. 7 is a side view showing a frame format of the display substrate according to the method of manufacturing a display structure of the present embodiment. The same components in FIG. 7 as those in the first embodiment have the same signs as those in the first embodiment.

The method of manufacturing a display structure of the present embodiment is different from the first embodiment in that a groove 31a is cut at the cutting portion 30 on the display substrate 1, and is the same as the first embodiment in other points. The groove 31a is formed with a predetermined width so as to cross under the flexible tape substrate 22 bonded to the extension area 12 of the display substrate 1, that is, in generally the center of the extension area 12 of the display substrate 1.

It is preferable that the groove 31a be formed before the flexible tape substrate 22 and the IC for driving 23 are mounted on the display substrate 1, that is, before the forth process. The groove 31a may be formed by using, for example, a mechanical method or laser.

Figure 8:
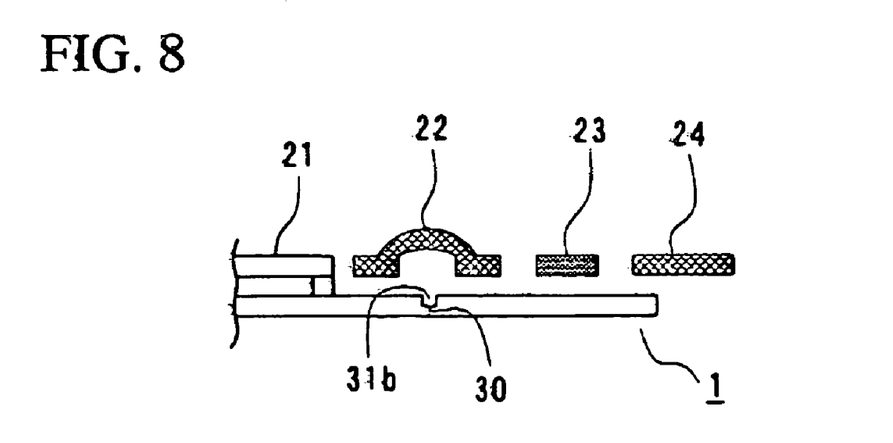
FIG. 8 is a side view showing a frame format of the modification example of the second embodiment.
Figure 9:
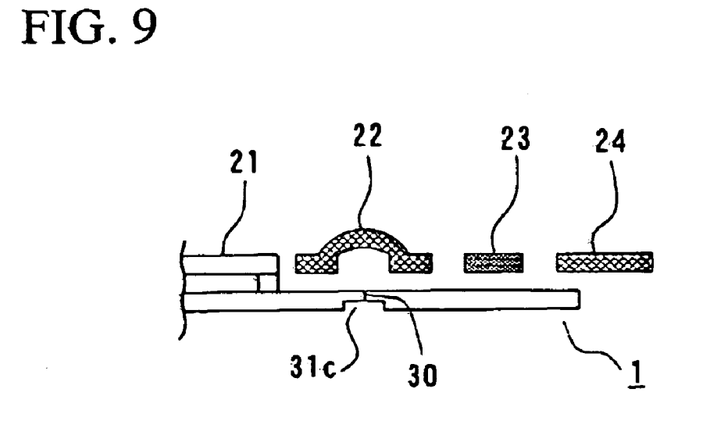
FIG. 9 is a side view showing a frame format of the modification example of the second embodiment

Modification examples of the present embodiment will be described with reference to FIG. 8 and FIG. 9. FIG. 8 and FIG. 9 are side views showing a frame formation of the display substrate according to the modification examples of the second embodiment. The width of a groove 31b on the display substrate 1 shown in FIG. 8 is narrower than that of the groove 31a in FIG. 7. A groove 31c on the display substrate 1 shown in FIG. 9 is formed on the back side of the display substrate 1 in contrast to the groove 31a and the groove 31b shown in FIG. 7 and FIG. 8 respectively.

According to the present embodiment, a force tending to bend the display substrate 1, which is a glass substrate, is exerted on the display substrate 1 after the grooves 31a, 31b, and 31c are formed, thereby the force acts on the grooves 31a, 31b, and 31c such that the display substrate 1 can be cut at the cutting portion 30, on which the grooves 31a, 31b, and 31c are formed. Therefore, according to the present embodiment, the display substrate 1 can be easily cut (bisected) at the cutting portion 30.

Timing when the display substrate 1 is cut is preferably the same as timing when the fifth step of the first embodiment is implemented.

Here, instead of forming the grooves 31a, 31b, and 31c, the display substrate 1 may be cut (bisect) at the cutting portion 30 by heating the cutting portion 30 with a method of irradiating laser light to the cutting portion 30 and the like, thereafter exerting a force on the display substrate 1.

(Third Embodiment)

Figure 10:
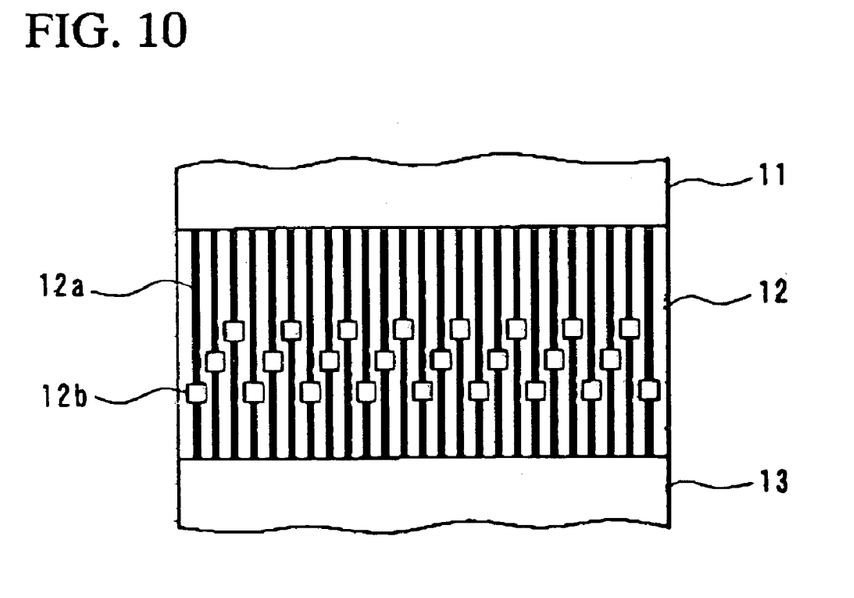
FIG. 10 is a plan view showing an essential part of the third embodiment of the present invention.

Next, a method of manufacturing a display structure according to third embodiment of the present invention will be described with reference to a drawing. FIG. 10 is a plan view showing an essential part of the display substrate according to the method of manufacturing a display substrate of the present embodiment, and is a plan view showing an essential part of a periphery of the extension area 12 of the display substrate. The same components in FIG. 10 as those in the first embodiment have the same signs as those in the first embodiment.

In the method of manufacturing a display structure of the present embodiment, on the extension area 12 of the display substrate 1, terminals 12b are formed on each wiring 12a as well as forming the plurality of the parallel wirings 12a. The plurality of the terminals 12b is preferably arranged in a staggered state each other as shown in FIG. 10. The terminals 12b function as connection points to probe terminals of various inspection machines. Furthermore, it is preferable that inspection of operation of the IC for driving 23 and the display device 21, which are mounted on the display substrate 1, is implemented by using the terminals 12b before the cutting of the display substrate 1 in the fifth step.

According to the present embodiment, since the terminals 12b for inspection can be formed on the extension area 12 of which an area is larger than a conventional frame of a display, terminals for inspection can be formed even though a flame is made narrower than a conventional frame such that the circuit operation can be easily and rapidly inspected in a manufacturing process, then, generation of defective products can be decreased before happens.

(Electronic Apparatus)

Figure 11:
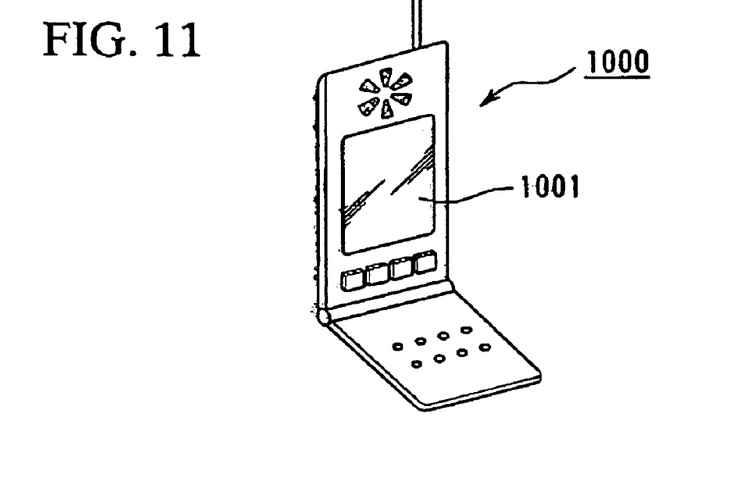
FIG. 11 is a diagram showing an example of an electronic apparatus having the structure of the present embodiments.

An example of electronic apparatus having a display structure such as a flat panel display manufactured by using the method of manufacturing a display structure of the embodiments will be described. FIG. 11 is a perspective view showing an example of mobile telephones. In FIG. 11, reference numbers 1000 and 1001 show a main part of a mobile telephone and a display part using the display structure respectively.

Figure 12:
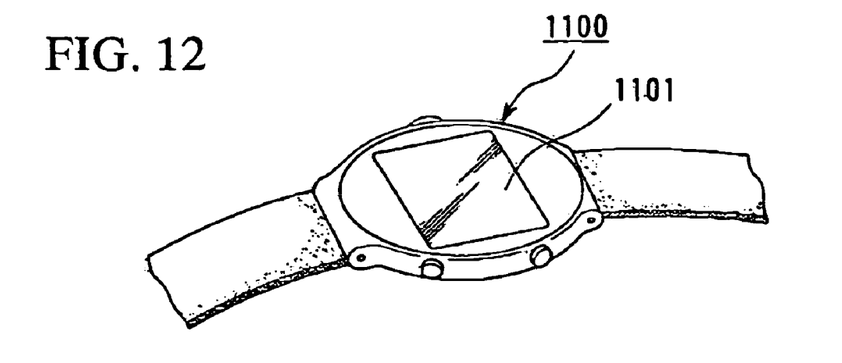
FIG. 12 is a diagram showing an example of an electronic apparatus having the structure of the present embodiments.

FIG. 12 is a perspective view showing an example of wristwatch type electronic apparatus. In FIG. 12, reference numbers 1100 and 1101 show a main part of a watch and a display part using the display structure.

Figure 13:
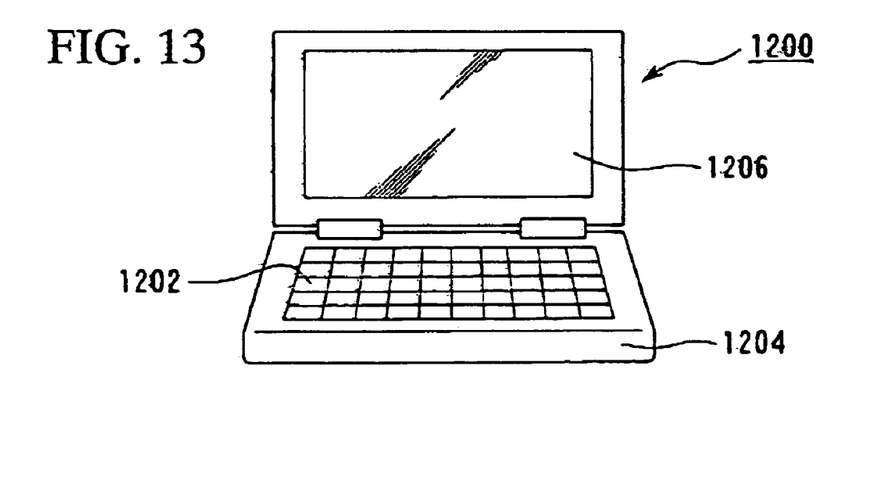
FIG. 13 is a diagram showing an example of an electronic apparatus having the structure of the present embodiments.

FIG. 13 is a perspective view showing an example of mobile information processing devices such as electronic personal organizers, personal digital assistants (PDA), word processors, and personal computers. In FIG. 13, reference numbers 1200, 1202, 1204, and 1206 show an information processing device, an input part such as a keyboard, a main part of the information processing device, and a display part using the display structure respectively.

Since the electronic apparatus shown in FIG. 11 through FIG. 13 have the display substrate manufactured by using the method of manufacturing of the embodiments, a form of overall apparatus can be miniaturized even though an area of display is made large such that high reliability and long product life can be realized.

Here, the scope of arts of the present invention is not limited by the embodiments, and a variety of modifications can be applied within the spirit of the present invention. The concrete materials, configurations, and the like included in the embodiments are just examples and can be accordingly modified.

What is claimed is:

1. A method of manufacturing a display structure, comprising the steps of:
   defining at least a display area, an extension area, and an IC mounting area on a display substrate, the display substrate constituting a part of one of a liquid crystal device, an organic electro luminescence device, and a plasma device;
   connecting a flexible tape substrate to the extension area of the display substrate;
   forming a cut substrate by cutting the display substrate at a cutting portion that is partially disposed under the flexible tape substrate on the extension area of the display substrate; and
   disposing the cut substrate on a back side of the display substrate, the back side being opposite to a front side where the display area is defined, wherein:
   before the cutting of the display substrate, a display is mounted on the display area, the flexible tape substrate is connected to the extension area, and a driving integrated circuit is mounted on the IC mounting area; and
   the display, the flexible substrate and the driving integrated circuit are all mounted on a front side of the display substrate.

2. A method of manufacturing a display structure, according to claim 1,
   wherein the display substrate comprises a glass substrate,
   the IC mounting area is defined on a part of the display substrate that is to become the cut substrate, and
   a driving integrated circuit is mounted on the IC mounting area by COG bonding before the cutting of the display substrate.

3. A method of manufacturing a display structure, according to claim 1, wherein a plurality of parallel wirings is formed on the front side and the extension area of the display substrate before the cutting.

4. A method of manufacturing a display structure, according to claim 3, further comprising the steps of:
   forming terminals on the wirings on the extension area of the display substrate; and
   inspecting a circuit operation by using the terminals before the cutting of the display substrate.

5. A method of manufacturing a display structure, according to claim 1, wherein the flexible tape substrate is connected to the extension area of the display substrate in such a manner that one end of the flexible tape substrate is connected to a part of the display substrate which is to become the cut substrate, and the other end of the flexible tape substrate is connected to another part of the display substrate which is different than the part which is to become the cut substrate.

6. A method of manufacturing a display structure, according to claim 1, wherein the flexible tape substrate is in a bent state when the flexible tape substrate is connected to the extension area of the display substrate.

7. A method of manufacturing a display structure, according to claim 1, wherein an area having a width that is at least twice a thickness of the display substrate is removed from the extension area by the cutting of the display substrate.

8. A method of manufacturing a display structure, according to claim 1, further comprising the step of cutting a groove at the cutting portion of the display substrate before the culling of the display substrate,
wherein the cutting of the display substrate is carried out by applying a force that bends the display substrate after the groove is formed.

9. A method of manufacturing a display structure, according to claim 8, wherein the groove is formed by using a laser.

10. A method of manufacturing a display structure, comprising the steps of:
defining at least a display area, an extension area, and an IC mounting area on a display substrate, the display substrate constituting a part of one of a liquid crystal device, an organic electro luminescence device, and a plasma device;
connecting a flexible tape substrate to the extension area of the display substrate;
forming a cut substrate by cutting the display substrate at a cutting portion that is partially disposed under the flexible tape substrate on the extension area of the display substrate; and
disposing the cut substrate on a back side of the display substrate, the back side being opposite to a front side where the display area is defined, wherein:
the flexible tape substrate is connected to the extension area of the display substrate in such a manner that one end of the flexible tape substrate is connected to a part of the display substrate which is become the cut substrate, and the other end of the flexible tape substrate is connected to another part of the display substrate which is different than the part which is to become the cut substrate;
a plurality of parallel wirings is formed on the flexible tape substrate, and
each wiring on the flexible tape substrate is respectively connected to each wiring on the extension area when the flexible tape substrate is connected to the extension area of the display substrate.

11. A method of manufacturing a display structure, comprising the steps of:
defining at least a display area, an extension area, and an IC mounting area on a display substrate, the display substrate constituting a part of one of a liquid crystal device, an organic electro luminescence device, and a plasma device;
connecting a flexible tape substrate to the extension area of the display substrate;
forming a cut substrate by cutting the display substrate at a cutting portion that is partially disposed under the flexible tape substrate on the extension area of the display substrate; and
disposing the cut substrate on a back side of the display substrate, the back side being opposite to a front side where the display area is defined,
wherein before the cutting of the display substrate, a second flexible tape substrate for external connection is connected to the IC mounting area which is on the front side of the display substrate.

* * * * *